UNITED STATES PATENT OFFICE 2,201,124

DISPERSIBLE HYDROPHILIC SULPHUR

Philip J. Ehman and Walter O. Walker, Marinette, Wis., assignors to Ansul Chemical Company, Marinette, Wis., a corporation of Wisconsin No Drawing. Application September 19, 1938, Serial No. 230,657

7 Claims. (Cl. 252—6)

This invention relates to dispersible sulphur compositions and to methods for preparing same.

An object of the invention consists in preparing hydrophilic colloidal sulphur compositions suitable for dispersion in water for use as a fungicidal and insecticidal plant spray or as a remedy for skin diseases in man or animals.

Another object of the invention consists in providing a hydrophilic colloidal sulphur paste composition containing ingredients which insure retention of sufficient moisture to stabilize the sulphur in hydrophilic form.

A further object of the invention resides in a process of preparing stabilized hydrophilic colloidal sulphur of amicronic particle size by suitable treatment of unstabilized hydrophilic colloidal sulphur.

Another object of the invention consists in providing a hydrophilic colloidal sulphur composition having improved properties for use as a fungicide, insecticide, germicide, and the like.

Other and further objects and advantages of the invention will be apparent from the following specification.

Briefly, our invention involves the preparation of a suitable hydrophilic colloidal sulphur sludge containing sulphur particles of amicronic size. After settling and/or centrifuging, the sludge is treated with certain agents which have a pronounced affinity for water. However, not all reagents which have an affinity for water may be used for this purpose, since some of them decompose the hydrophilic colloidal sulphur. The action of the agent on the sulphur sludge is two-fold. First, it removes the excess mother liquor which may be associated with the sulphur, and second, a certain amount of the agent remains with the hydrophilic colloidal sulphur thereby insuring the retention of sufficient moisture to stabilize the sulphur in the hydrophilic form.

In order to prepare our hydrophilic colloidal sulphur composition it is first necessary to prepare finely divided sulphur of amicronic particle size by any suitable method. A convenient method of making hydrophilic colloidal sulphur consists in reacting gaseous hydrogen sulphide and sulphur dioxide under suitable conditions. The sulphur containing aqueous liquor resulting from this reaction is run into a settling tank where the hydrophilic colloidal sulphur gradually settles to the bottom forming a thick sludge which is separated. Instead of settling, the liquor may be centrifuged to yield the hydrophilic colloidal sulphur sludge. A small amount of polythionic acids is formed by the reaction of hydrogen sulphide and sulphur dioxide under suitable conditions, and acts as a peptizing agent for the sulphur. To this sulphur sludge we add from 0.01% to about 40% by weight, preferably about 10 to 20% by weight, of a stabilizing agent or mixture of stabilizing agents selected from the group consisting of:

Maltose
Glycerine
Sucrose
Dextrose
Molasses
Karo syrup (glucose)
Glycopon 2A (sulphited glycol carbohydrate as now sold under this trade-name by Glyco Products Co.).
Triethylene glycol
Diethylene glycol
Propylene glycol Glycopon B (a glycol carbohydrate composition as now sold by Glyco Products Co.).

The addition of stabilizer to the hydrophilic colloidal sulphur sludge causes an immediate agglomeration of the sulphur particles into a thick curd from which the excess liquor and excess stabilizer are removed by draining, centrifuging or other suitable means.

Our stabilizing agents are characterized by a number of unusual characteristics. They are capable of hastening the process of concentration of the hydrophilic colloidal sulphur particles by the absorption of mother liquor from the sulphur sludge. The stabilizing agent will not bring about a chemical decomposition of the peptizing agents; that is, polythionic acids, such as is caused by the addition of alkalies, nor an ionic coagulation of the colloidal sulphur, such as is caused by the addition of sodium chloride or any other ionized compound. The stabilizing agents possess an affinity for water, that is, they have the property of retaining moisture when combined with the hydrophilic colloidal sulphur, thus protecting the peptizing agents, that is polythionic acids, from decomposition due to loss of moisture. The stabilizing agents have boiling points sufficiently high such that all mixtures with water possess a partial pressure of water in the vapor above the mixtures, less than that of pure water at the same temperature. The stabilizing agents have the property of inhibiting the crystallization of the sulphur particles, at least in reducing the crystal size, when the sulphur is allowed to stand for some time.

The hydrophilic colloidal sulphur composition made according to our invention consists of stabilized hydrophilic colloidal sulphur which is readily dispersible in water. The composition as made is preferably in a paste form containing between about 10% and 30% by weight of water, about 20% by weight of water being preferred. The stabilized hydrophilic colloidal sulphur is united with polythionic acids as the peptizing agents. The range of concentration of polythionic acids in the stabilized hydrophilic colloidal sulphur is between about 0.05% and 10% by weight, preferably about 5% by weight, represented as pentathionic acid ($H_2S_5O_6$).

The stabilizing hydrophilic colloidal sulphur composition has an acidity requiring between 0.05 and 20 c. c. of 0.1 normal sodium hydroxide per gram and may contain in addition to polythionic acids, small amounts of sulphuric acid, thiosulphuric acid, sulphurous acid and hydrogen sulphide when the hydrophilic colloidal sulphur is produced by reacting hydrogen sulphide and sulphur dioxide. The stabilized hydrophilic colloidal sulphur has either a yellow or greenish black color, depending on the stabilizer used. The stabilized hydrophilic colloidal sulphur may contain from 0.01% to 20% by weight of stabilizing agent, preferably about 2 to 10% by weight.

The stabilized hydrophilic colloidal sulphur composition prepared according to our method may be used as follows: Our hydrophilic colloidal sulphur composition dissolved in water at a concentration of about 1 to 3 pounds to 100 gallons produces a plant spray solution very effective against all types of fungi and bacterial diseases, red spider and scale insects. Our hydrophilic colloidal sulphur, either as a paste or a water or alcohol solution is very effective in the control of skin diseases in man, such as scabies and ringworm, a typical example of which is athlete's foot. Our hydrophilic colloidal sulphur, either as a paste or a water or alcohol solution is also very effective in the control of skin diseases of animals, such as mange in dogs.

The composition prepared by our method is unusually stable and can be kept for a long period of time without losing its dispersibility in water or alcohol. We have thus succeeded in producing a highly stable dispersible composition by discovering the critical limits of water content of the composition and the proportions of the stabilizers used as herein disclosed.

We claim:

1. A composition of matter dispersible in water comprising hydrophilic colloidal sulphur of amicronic particle size, about 5% by weight of polythionic acids as a peptizing agent, about 20% by weight of water, and about 2 to 10% by weight of a stabilizing agent selected from the group consisting of sucrose, maltose, dextrose, glycerine, molasses, glucose, "Glycopon B" (a glycol carbohydrate composition), "Glycopon 2A" (sulphited glycol carbohydrate), triethylene glycol, diethylene glycol, and propylene glycol.

2. A composition of matter dispersible in water comprising hydrophilic colloidal sulphur of amicronic particle size, about 0.05 to 10% by weight of polythionic acids as a peptizing agent, about 10 to 30% by weight of water, and about 0.01% to 20% by weight of a stabilizing agent selected from the group consisting of sucrose, maltose, dextrose, glycerine, molasses, glucose, "Glycopon B" (a glycol carbohydrate composition), "Glycopon 2A" (sulphited glycol carbohydrate), triethylene glycol, diethylene glycol, and propylene glycol.

3. A composition of matter dispersible in water comprising hydrophilic colloidal sulphur of amicronic particle size, about 0.5 to 10% by weight polythionic acids, about 10 to 30% by weight of water and about 2 to 10% by weight of sucrose.

4. A composition of matter dispersible in water comprising hydrophilic colloidal sulphur of amicronic particle size, about 20% by weight of water, about 5% by weight of polythionic acids, and about 2 to 10% by weight of sucrose.

5. The process of making a composition of matter readily dispersible in water comprising preparing an aqueous sludge of hydrophilic colloidal sulphur of amicronic particle size containing polythionic acids, and adding to said sludge a stabilizer from the group consisting of sucrose, maltose, dextrose, glycerine, molasses, glucose, "Glycopon B" (a glycol carbohydrate composition), "Glycopon 2A" (sulphited glycol carbohydrate), triethylene glycol, diethylene glycol, and propylene glycol, thereby reducing the water content of the sludge to about 10 to 30% by weight to form a paste of suitable consistency containing about 0.05 to 10% by weight of polythionic acids and about 0.01 to 20% by weight of stabilizer.

6. The process of making a composition of matter readily dispersible in water comprising reacting gaseous hydrogen sulphide and sulphur dioxide to form an aqueous sludge of hydrophilic colloidal sulphur of amicronic particle size containing polythionic acids, adding to said sludge about 0.01 to 40% by weight of a stabilizer selected from the group consisting of sucrose, maltose, dextrose, glycerine, molasses, glucose, "Glycopon B" (a glycol carbohydrate composition), "Glycopon 2A" (sulphited glycol carbohydrate), triethylene glycol, diethylene glycol, and propylene glycol, and removing excess liquor, thereby reducing the water content of the sludge to about 10 to 30% by weight to form a paste of suitable consistency containing about 0.05 to 10% by weight of polythionic acids.

7. The process of making a composition of matter readily dispersible in water which comprises reacting hydrogen sulphide and sulphur dioxide to produce a liquor containing hydrophilic colloidal sulphur of amicronic particle size and small amounts of polythionic acids, separating the hydrophilic colloidal sulphur sludge from the mother liquor, and adding to said sludge about 0.01 to 20% by weight of a suitable stabilizer selected from the group consisting of sucrose, maltose, dextrose, glycerine, molasses, glucose, "Glycopon B" (a glycol carbohydrate composition), "Glycopon 2A" (sulphited glycol carbohydrate), triethylene glycol, diethylene glycol, and propylene glycol, and removing excess liquor, thereby reducing the water content to about 10 to 30% by weight to form a paste of suitable consistency and stability containing about 0.05 to 10% by weight polythionic acids.

PHILIP J. EHMAN.
WALTER O. WALKER.